United States Patent [19]

Kleeb

[11] 4,430,439

[45] Feb. 7, 1984

[54] MONOLITHIC REFRACTORIES

[75] Inventor: Thomas R. Kleeb, Pittsburgh, Pa.

[73] Assignee: Dresser Industries, Inc., Dallas, Tex.

[21] Appl. No.: 457,345

[22] Filed: Jan. 12, 1983

[51] Int. Cl.$^3$ ............................................. C04B 35/80
[52] U.S. Cl. ........................................ 501/95; 501/82; 501/124; 501/127
[58] Field of Search ..................... 501/81, 82, 95, 124, 501/127

[56] References Cited

U.S. PATENT DOCUMENTS

| | | | |
|---|---|---|---|
| 1,743,803 | 1/1930 | Arensberg et al. | 501/81 |
| 2,278,486 | 4/1942 | Quigley et al. | 501/95 |
| 3,982,953 | 9/1976 | Ivarsson et al. | 501/127 |

FOREIGN PATENT DOCUMENTS

| | | | |
|---|---|---|---|
| 2155763 | 5/1973 | Fed. Rep. of Germany | 501/95 |
| 1002486 | 8/1965 | United Kingdom | 501/95 |

*Primary Examiner*—James Poer
*Attorney, Agent, or Firm*—B. E. Deutsch

[57] ABSTRACT

Monolithic refractories comprising non-basic refractory aggregates, a binder, and vinyl chloride acetate.

4 Claims, 8 Drawing Figures

PRESENT INVENTION

PRIOR ART

PRESENT INVENTION

PRIOR ART

MONOLITHIC REFRACTORIES

Refractories are non-metallic materials used to withstand high temperature. More specifically, they are the materials which are used to build high temperature steel making and glass making furnaces. Most refractories are supplied as preformed shapes, including brick, which have been formed by extruding or pressing. Not all refractories are supplied as shapes, however. Some refractories referred to as refractory monoliths, are supplied in a particulate form. These refractories are rammed, cast, gunned or trowelled into place as opposed to being built of jointed brickwork, and as a result, are monolithic. Monolithic ramming mixes comprised of particulate refractory material are usually tempered with about 3% water and have properties which permit ramming or tamping into place. Monolithic casting mixes are similar to ramming mixes, but are usually tempered with more water and have properties which permit them to be cast, usually with the aid of vibration.

Casting and ramming mixes typically contain a refractory cement or binder. The binder must provide linings prepared from ramming and casting mixes with sufficient rigidity to withstand the conditions encountered in the particular furnace. Often the binder is merely temporary and its bond is replaced at elevated temperatures by a ceramic bond formed by sintering and coalescing of the particles comprising the monolithic lining. On the other hand, the binder may become part of the ceramic bond formed at high temperatures. Monolithic gunning mixes are particulate refractory mixes which are pneumatically impacted upon the situs to be lined or repaired. They are tempered with water either prior to being placed in the pneumatic gun or tempered at the nozzle of the gun. Gunning mixes usually contain a quick setting binder which holds the gunned lining or repair patch where it is emplaced. This invention relates to refractory monoliths, referred to above, which are finely ground preparations capable of becoming plastic and trowellable when tempered with water and suitable for patching brick work and for laying and bonding refractory brick or shapes.

Binders used in refractory monoliths and mortars are numerous and include sulphite lye, sodium silicate, molasses, dextrine, starch, gelatin, calcium aluminate cements, epsom salts, and any number of phosphates. With the exception of the phosphate binders, most refractory binders lose their strength on heating well below the temperature at which ceramic bonds are formed. Phosphate binders on the other hand, develop bonds on heating which remain relatively strong at elevated temperatures and, to some extent, participate in the formation of ceramic bonds. Phosphate binders have the additional advantage of providing refractory linings with a certain resistance to wetting, by corrosive slags and metals. The phosphates suitable as binders for refractory monoliths comprise the soluble phosphates, including the sodium phosphate salts, sodium phosphate glasses, ammonium phosphates, and phosphoric acid.

Dense refractory monoliths must be dried after installation. The higher the density, the lower the porosity, resulting in few paths being available for water vapor to leave the refractory or drying.

U.S. Pat. No. 1,743,803 is indicative of the prior art. It relates to additives which are plate-like and oriented parallel to one another by the fabricating procedure as will be discussed hereinafter.

Accordingly, it is among the objects of this invention to provide monolithic refractories which provide channels for water vapor to escape before the vapor is formed.

It is another object of the invention to provide monolithic refractories having channel volume available to release high pressure steam at temperatures where other additives are still intact.

IN THE DRAWINGS

Figure 1:
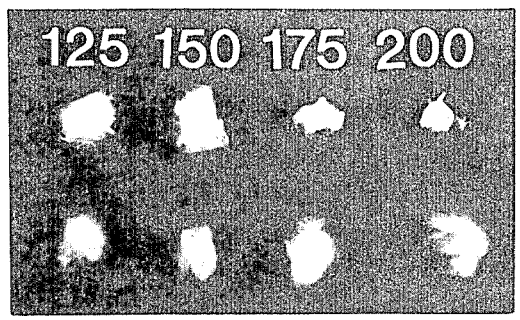
FIGS. 1 and 2 are photo micrographs showing the effects of temperature on additives of the invention compared to the prior art.

Briefly, according to the invention, there is provided monolithic refractories consisting essentially of non-basic refractory aggregates, a binder and vinyl chloride acetate additive.

Preferably, the length of the fibers do not exceed 0.50 inch and have a diameter between about 1 and 15 microns.

Further features and other objects and advantages of this invention will become apparent to those skilled in the art by a study of the following examples. In the specification and claims, all percentages are by weight. All sizings are according to the Tyler Sieve series.

Various monolithic refractory batches were prepared by first size grading the components so that a maximum of 45% is held on 4 mesh; from 45 to 55% is $-4+10$ mesh; from 1 to 5% is $-10+28$ mesh; and from 1 to 5% is $-28+65$ mesh. From about 35 to 45%, passes a 65 mesh screen. After mixing the batch ingredients together, water is blended into the batch.

Blocks measuring $18 \times 12 \times 9''$ were cast incorporating four different fibers (including the present invention). The optimum fiber addition was determined based on mixing and casting properties and the results of the steam spalling test. The mixes and properties are shown in Table I below.

TABLE I

| MIX: | 1 | 2 | 3 | 4 | 5 | 6 | 7 |
|---|---|---|---|---|---|---|---|
| Aluminous Refractory Aggregates | | | | 100% | | | |
| PLUS ADDITIONS: | | | | | | | |
| Vinyl Chloride Acetate | 0 | 0.6% | 0.3% | 0.2% | 0.1% | 0 | 0 |
| Ceramic Fibers A | 0 | 0 | 0 | 0 | 0 | 0.3% | 0.2% |
| Polypropylene | 0 | 0 | 0 | 0 | 0 | 0 | 0 |
| Ceramic Fibers B | 0 | 0 | 0 | 0 | 0 | 0 | 0 |
| Water | 8.25% | 8.4% | 7.6% | 7.75% | 7.4% | 7.75% | 8.5% |
| CASTING PROPERTIES: | Cast Well | Mix was Fat. Fibers Dispersed | Cast Well Fibers Dispersed | Same as Mix 2 | Same as Mix 2 | Cast Well Fiber Balls | Same as Mix 6 |

TABLE I-continued

|  |  | Well | Well |  |  |  |  |
|---|---|---|---|---|---|---|---|
| STEAM SPALLING TEST: | | | | | | | |
| Temperature of Spalling, °F. | 1900 | — | — | — | 2160 | 2100 | — |
| % of Hot Face Spalled | 100 | 0 | 0 | 0 | 100 | 100 | 0 |

| MIX: | 8 | 9 | 10 | 11 | 12 | 13 | 14 |
|---|---|---|---|---|---|---|---|
| Aluminous Refractory Aggregates | | | | 100% | | | |
| PLUS ADDITIONS: | | | | | | | |
| Vinyl Chloride Acetate | 0 | 0 | 0 | 0 | 0 | 0 | 0 |
| Ceramic Fibers A | 0.2% | 0 | 0 | 0 | 0 | 0 | 0 |
| Polypropylene | 0 | 0.2% | 0.05% | 0.4% | 0.3% | 0.1% | 0 |
| Ceramic Fibers B | 0 | 0 | 0 | 0 | 0 | 0 | 0.2% |
| Water | 8.5% | 8.5% | 8.5% | 7.5% | 7.5% | 7.25% | 7.75% |
| CASTING PROPERTIES: | Same as Mix 6 | Wouldn't Mix Properly | Cast Fair Fibers Dispersed Well | Casting Difficulty Fibers Tangled | Same as Mix 11 | Same as Mix 11 | Same as Mix 11 |
| STEAM SPALLING TEST: | | | | | | | |
| Temperature of Spalling, °F. | 2170 | — | 1900 | 2150 | 2100 | 2120 | 2010 |
| % of Hot Face Spalled | 60 | — | 100 | 100 | 100 | 30 | 100 |

None of the fibers were found to have a significant effect on physical properties, including aluminum penetration inversion test. Vinyl chloride acetate was the only fiber which consistently improved the steam spalling resistance. The use of this fiber was successful at levels between 0.2% and 0.6%. The optimum fiber content was 0.3%, to insure a margin of error above the 0.2% level. The fibers break up and disperse easily during dry mixing, due to their short length and small diameter.

The use of ceramic fiber A resulted in slight improvement in steam spalling resistance, but not to the extent provided by vinyl chloride acetate. The sample obtained was roving and about 1.5" in length. The fiber tended to ball during mixing and was difficult to distribute evenly.

The polypropylene fibers did not appear to improve the resistance to steam spalling at levels up to 0.3%.

Ceramic fibers B did not improve resistance to spalling at a 0.2% level.

Vinyl chloride acetate fibers show a 50% shrinkage at 105° F. Since this is lower than the boiling point of water, the shrunken fibers leave channels through which water vapor can escape. Since the channels are equal to the diameter of the fiber, about 15 microns, molten metals or slags do not penetrate the refractory. The use of straw, paper fiber or synthetic organic polymer fibers leave larger channels and impede the flow of water vapor.

Figure 2:
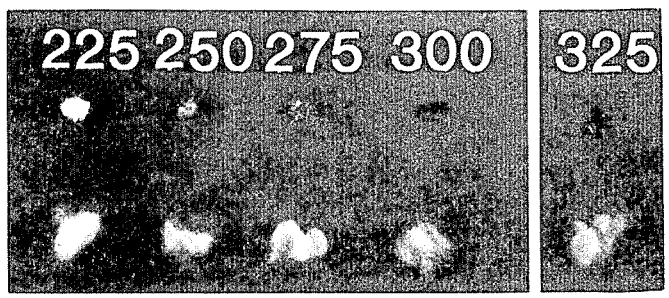

Referring to the drawings, in FIGS. 1 and 2, the vinyl chloride acetate fibers (present invention) showed shrinkage at 175° F. They continued to shrink with increasing temperature until they were melted by 300° F. The polypropylene fibers (prior art) were unaffected by temperatures up to 300° F. They began to show shrinkage at 325° F. and finally melted at 350° F.

Figure 3:
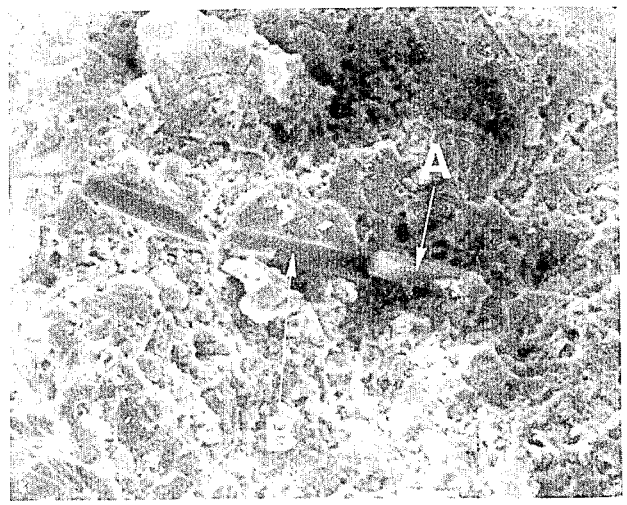
FIGS. 3 to 8 are scanning electron micrographs showing surfaces of high alumina castables containing various organic additives after the materials have been heat treated.
Figure 4:
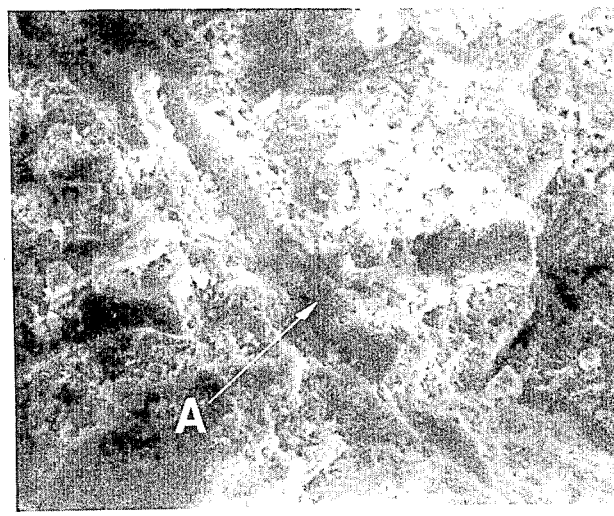
Figure 5:
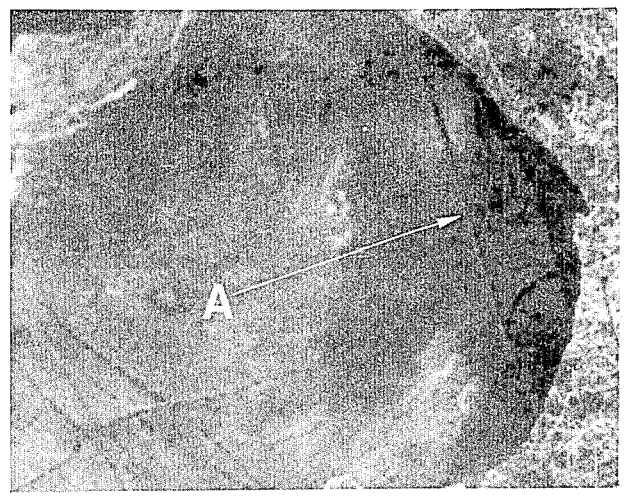

FIGS. 3 through 8 are scanning electron micrographs showing fractured surfaces of high alumina castables containing various organic additives after the castables have been heat treated. FIG. 3 shows a shrunken vinyl chloride acetate fiber (A) and the channel it formed (B) after heating to 250° F. The channels left by melted vinyl chloride acetate (A) after heating to 300° F. are shown in FIG. 4.

Figure 6:
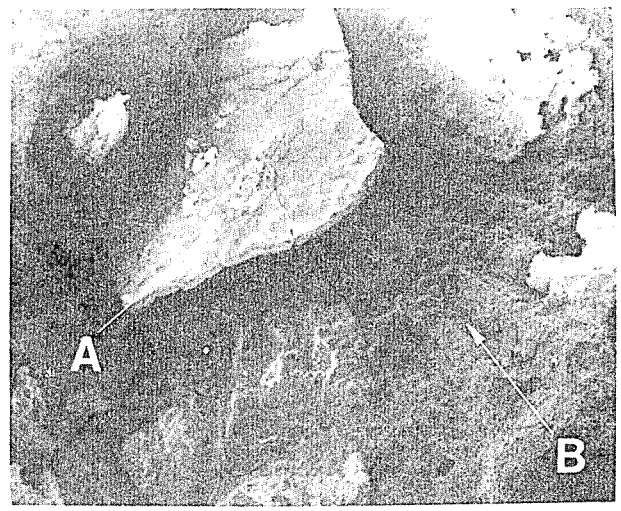
Figure 7:
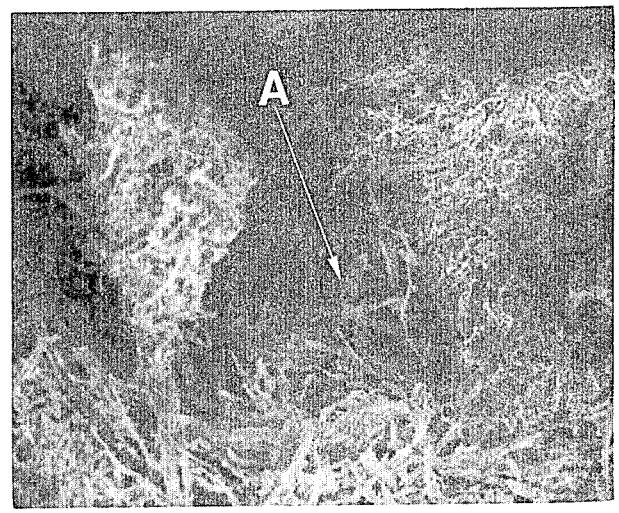
Figure 8:
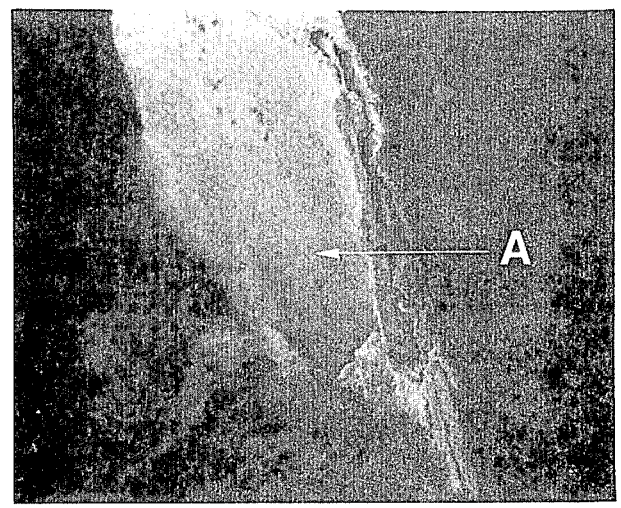

FIGS. 5 through 8 show samples which have all been heated to 300° F. The polypropylene fibers are shown in FIG. 5(A). FIG. 6 shows a piece of fish scale (A) remaining after heat treatment. The rest of the scale broke off when the sample was fractured. The scalloped imprint of the original scale is still visible (B). Note the size of the imperfection created by the fish scale addition, as this photograph is magnified only 20×. FIG. 7 shows wood fibers (A) from a paper confetti additive. This photograph shows one piece of confetti. What it doesn't show is that the wood fibers are not dispersed throughout the sample, but are concentrated at the confetti locations. FIG. 8 shows a lamellar cucumber seed (A) in the castable. Again, the magnification of this is only 20×, so the void created by the eventual burnout of the seed is large. Samples containing narrow rye grass seed and cotton fibers were similarly unsatisfactory.

FIGS. 6, 7 and 8 are of additives disclosed in U.S. Pat. No. 1,743,803. The additives in '803 are all plate-like and are oriented parallel to one another by the fabricating procedure. On burning, this results in long, flat pores which are perpendicular to the thermal gradient in the ware. This would provide a certain flexibility in the direction of the thermal gradient, improving resistance to thermal shock. Since the additives are not oriented perpendicular to the surface, they do not provide paths for moving water toward the surface on drying. Even if the additives in '803 were oriented toward the surface or randomly oriented, the pores they leave behind on burnout would be so large that the refractory would be subject to metal and slag penetration.

In summary, the vinyl chloride acetate fibers are an improvement on the state of the art. The shrinkage of vinyl chloride acetate at temperatures below the boiling point of water provides clear channels to allow release of water vapor before the vapor is formed. Its relatively low melting temperature further increases the channel volume available to release high pressure steam at temperatures where other additives are still intact. A distinguishing feature of vinyl chloride acetate is that the diameter of the pores formed by the shrinkage and melting thereof are only 15 microns in diameter, too small to allow molten metal and slag to penetrate.

It is intended that the foregoing description and drawings be construed as illustrative and not in limitation of the invention.

The embodiments of the invention in which an exclusive property or privilege is claimed are defined as follows:

1. Monolithic refractories consisting essentially of, by weight, 0.2 to 0.6% vinyl chloride acetate fibers, and the balance non-basic refractory aggregates, and a binding agent, said monolithic refractories having improved steam spalling resistance.

2. Refractories of claim 1 in which the fibers do not exceed about 0.5″ in length.

3. Refractories of claim 1, in which the fibers have a diameter between about 1 and 15 microns.

4. Refractories of claim 1, which comprises, by weight, 0.2 to 0.3%, vinyl chloride acetate.

* * * * *